(12) United States Patent
Sieksmeier et al.

(10) Patent No.: US 10,913,608 B2
(45) Date of Patent: Feb. 9, 2021

(54) ROLLER TESTING DEVICE FOR A ROLLER ADAPTER OF AN OVERHEAD CONVEYOR SYSTEM

(71) Applicant: Dürkopp Fördertechnik GmbH, Bielefeld (DE)

(72) Inventors: Dirk Sieksmeier, Spenge (DE); Markus Merten, Bielefeld (DE)

(73) Assignee: Dürkopp Fördertechnik GmbH, Bielefeld (DE)

(*) Notice: Subject to any disclaimer, the term of this patent is extended or adjusted under 35 U.S.C. 154(b) by 0 days.

(21) Appl. No.: 16/564,202

(22) Filed: Sep. 9, 2019

(65) Prior Publication Data
US 2020/0079594 A1 Mar. 12, 2020

(30) Foreign Application Priority Data
Sep. 10, 2018 (DE) .................. 10 2018 215 319

(51) Int. Cl.
*B65G 9/00* (2006.01)
*B65G 43/02* (2006.01)
*B65G 19/02* (2006.01)

(52) U.S. Cl.
CPC .......... *B65G 9/002* (2013.01); *B65G 19/025* (2013.01); *B65G 43/02* (2013.01); *B65G 2203/0275* (2013.01); *B65G 2203/044* (2013.01)

(58) Field of Classification Search
None
See application file for complete search history.

(56) References Cited

U.S. PATENT DOCUMENTS

| 6,474,463 | B1 | 11/2002 | Wölfel |
| 9,056,722 | B2 | 6/2015 | Otto |
| 2004/0206606 | A1 | 10/2004 | Hochhaus et al. |
| 2011/0147332 | A1 | 6/2011 | Breyer et al. |
| 2016/0194157 | A1* | 7/2016 | Senn ............... B65G 35/06 414/467 |
| 2016/0195869 | A1* | 7/2016 | Sagemueller ...... G05B 19/402 700/195 |
| 2019/0331552 | A1* | 10/2019 | Moutsouris ......... G01M 13/045 |

FOREIGN PATENT DOCUMENTS

| DE | 198 25 955 A1 | 12/1999 |
| DE | 103 17 946 A1 | 11/2004 |
| EP | 2 130 968 A1 | 12/2009 |

(Continued)

OTHER PUBLICATIONS

PSI et al., "Verlässliche Systeme schaffen Betriebs-und Prozess-Sicherheit", Aug. 9, 2016 (Aug. 9, 2016), XP055661483, found on the Internet: URL: https://web.archive.org/web/20160809050043if_/http://psi-technics.com/PDF/D/PSI-2458-Applikationsbericht-VW-Inlinekontrolle-DE-2014-01-10-1.pdf (accessed on Jan. 23, 2020).

*Primary Examiner* — Michelle M Iacoletti
(74) *Attorney, Agent, or Firm* — McGlew and Tuttle, P.C.

(57) ABSTRACT

The invention relates to a roller testing device for a roller adapter of an overhead conveyor system comprising a drive unit for rotatably driving at least one carrying roller of the roller adapter, a sensor unit for capturing a measured value correlating with a state of wear of a pivot bearing of the at least one carrying roller and an evaluation unit for determining the state of wear on the basis of the measured value.

19 Claims, 4 Drawing Sheets

(56) References Cited

FOREIGN PATENT DOCUMENTS

| | | |
|---|---|---|
| EP | 2 818 434 A1 | 12/2014 |
| FR | 2 942 282 A1 | 8/2010 |
| JP | 2005 061933 A | 3/2005 |
| JP | 2008 039708 A | 2/2008 |
| JP | 2018 132332 A | 8/2018 |
| WO | WO-2016115591 A1 * 7/2016 | ............. B65G 43/02 |

* cited by examiner

ROLLER TESTING DEVICE FOR A ROLLER ADAPTER OF AN OVERHEAD CONVEYOR SYSTEM

CROSS-REFERENCE TO RELATED APPLICATIONS

This application claims the priority of German Patent Application, Serial No. DE 10 2018 215 319.1, filed on Sep. 10, 2018, pursuant to 35 U.S.C. 119(a)-(d), the content of which is incorporated herein by reference in its entirety as if fully set forth herein.

FIELD OF THE INVENTION

The invention relates to a roller testing device for a roller adapter of an overhead conveyor system, an overhead conveyor system comprising such a roller testing device as well as such a roller adapter. Further on, the invention relates to a method for operating a roller testing device.

BACKGROUND OF THE INVENTION

From EP 2 130 968 A1, an overhead conveyor system for the transport of goods is known. The overhead conveyor system has a conveyor rail device for the transport of roller adapters along a conveying line. The roller adapters are subject to a wearing process. Worn roller adapters may block during the transport along the conveyor rail device and thus disturb the operation of the overhead conveyor system. In particular, undesired and cost-intensive downtimes may occur.

SUMMARY OF THE INVENTION

An object of the invention is to create a device which ensures the failure-free operation of an overhead conveyor system in an especially reliable manner. In particular, for this purpose, the device shall provide for a detection of worn roller adapters at an early stage.

This object is achieved by a roller testing device for a roller adapter of an overhead conveyor system, comprising a drive unit for rotatably driving at least one carrying roller of the roller adapter, a sensor unit for capturing a measured value correlating with a state of wear of a pivot bearing of the at least one carrying roller and an evaluation unit for the determination of the state of wear on the basis of the measured value. The core of the invention is that the roller testing device has the drive unit for rotatably driving the at least one carrying roller as well as the sensor unit for capturing the measured value correlating with the state of wear of the pivot bearing, wherein the evaluation unit is configured for determining the state of wear on the basis of the measured value. The roller testing device thus, in particular, is configured for the automated determination of the state of wear of the roller adapter, in particular of the respective pivot bearing of the roller adapter.

Due to the determination of the state of wear, worn roller adapters can be detected at an early stage. In particular, roller adapters with sluggish pivot bearings can be identified. Due to the early detection of such worn roller adapters, a blocking of roller adapters in a conveyor rail device of the overhead conveyor system can be avoided reliably. A downtime and/or a damaging of the overhead conveyor system by blocking roller adapters thus can be avoided. By means of the roller testing device, the roller adapters can be sorted out on the basis of their actual wear. A replacement of all roller adapters after a certain service life, independently from the actual wear of the roller adapters, can be avoided. The overhead conveyor system thus can be operated in an especially economical manner.

According to one aspect of the invention, the drive unit for rotatably driving the at least one carrying roller has a drive motor. The drive motor can interact with the at least one carrying roller via a drive coupling of the drive unit. Preferably, the drive coupling can be connected reversibly with the at least one carrying roller for the transmission of the rotary movement. The rotary movement can be transmitted on the front side and/or circumferentially to the at least one carrying roller by means of the drive coupling. According to one aspect of the invention, the drive unit is configured exclusively for rotatably driving the at least one carrying roller for the determination of the state of wear of the roller adapter, in particular of the at least one pivot bearing.

According to another aspect of the invention, the sensor unit for capturing the measured value correlating with the state of wear of the pivot bearing has at least one sensor. The sensor can be configured as an acceleration sensor, in particular as a vibration sensor. Depending on a vibration of the rotatably driven pivot bearing, the state of wear can be deduced by means of the acceleration sensor. The sensor can also be configured as a microphone. By means of the microphone, for example, a rotational speed of the at least one carrying roller can be determined on the basis of the operating noises. In particular, a change in the rotational speed can be determined on the basis of the operating noises. The sensor can also be configured as a temperature sensor, in particular as an infrared sensor and/or as a thermal imaging camera. By means of the temperature sensor, a frictional heat correlating with the state of wear of the roller adapter can be determined in the pivot bearing. The sensor can also be configured as an optical sensor, in particular as a light barrier. For capturing the rotary movement of the at least one carrying roller, in particular a change in the rotational speed correlating with the state of wear, the optical sensor, for example, can capture a rotary movement of a perforated disc connected with the at least one carrying roller and/or of a reflecting region. The sensor can also be configured as a capacitive sensor and/or as an inductive sensor, in particular as a Hall sensor. For example, a permanent magnet can be arranged on the at least one carrying roller, which is captured by means of the inductive sensor for the determination of a rotary movement of the at least one carrying roller.

According to one aspect of the invention, the roller testing device has an identification means reader. The identification means reader can be configured for capturing an identification code assigned to each roller adapter individually, in particular an identification number. Preferably, the identification means reader is configured to read out a radio-frequency identification (RFID) transponder and/or a matrix code and/or a bar code. Preferably, the identification means reader has a signal connection with the evaluation unit.

According to one aspect of the invention, the roller testing device has a carrying unit for carrying the roller adapter. The carrying unit can be configured as a rail profile. Preferably, the sensor unit is arranged on the carrying unit in a stationary manner, in particular rigidly connected with the carrying unit. According to another aspect of the invention, the drive unit is configured for displacing, in particular in a linear manner, the roller adapter in relation to the carrying unit. The sensor unit can be configured for capturing the measured value correlating with the state of wear of the pivot bearing during the displacement of the roller adapter in relation to the carrying unit. The sensor unit can also be configured, in particular with the roller adapter, in a displaceable manner in relation to the carrying unit.

According to another aspect of the invention, the sensor unit is arranged laterally on the roller adapter. The sensor unit can be arranged spaced from the carrying unit. The sensor unit can also be arranged directly on the carrying unit.

A roller testing device wherein the sensor unit has a rotary sensor for capturing the measured value in the form of a rotary movement of the at least one carrying roller ensures the capturing of the measured value correlating with the state of wear of the pivot bearing in an especially reliable manner. The rotary sensor can be configured for capturing the number of revolutions and/or a rotational speed and/or a change in the rotational speed of the at least one carrying roller. The rotary sensor can also be configured for the determination of coasting down duration. The coasting down duration is determined by the time period, which passes between the entry of the at least one carrying roller into the capturing region of the rotary sensor and the point of time when the at least one carrying roller stands still against a base body of the roller adapter. The rotary movement correlates with a rotational resistance of the at least one carrying roller in relation to the base body, wherein the rotational resistance correlates with the state of wear of the roller adapter, in particular of the pivot bearings.

Capturing the rotary movement of the at least one carrying roller thus provides for a deduction of the state of wear of the roller adapter in an especially simple manner.

A roller testing device wherein the sensor unit has a camera system for optically capturing the measured value can be operated especially flexibly. The system, for example, is configured for capturing a mark arranged on the at least one carrying roller. The evaluation unit can be configured to determine a rotary movement of the at least one carrying roller on the basis of the captured measured value. The system can be configured in a flexible manner for capturing different marks. In particular, the sensor unit, having a camera system, can be configured for capturing the rotary movement of the at least one carrying roller in a continuous movement of the roller adapter in relation to the carrying unit. The roller testing device thus can be integrated in a continuous conveying process of the roller adapter. Capturing the measured value can take place especially robustly, in particular during an undetermined movement, in particular despite vibration movements and/or pendulum movements, of the roller adapter.

A roller testing device wherein the drive unit has a counter roller body and a drive means for the linear displacement of the roller adapter in relation to the counter roller body, wherein the counter roller body is arranged on the at least one carrying roller such that the at least one carrying roller can be rotatably driven by the displacement in relation to the counter roller body can be operated especially efficiently and can be realized in an economical manner. The drive unit can be configured as a rail drive for conveying the roller adapter along a rail profile. The counter roller body can comprise a carrying rail of the rail profile. The drive means, preferably, is configured as a chain drive. Preferably, the drive means is configured for the linear displacement of the roller adapter parallel to the carrying rail. The roller testing device thus can be integrated especially simply into the conveyor rail device.

A roller testing device wherein the counter roller body has a projecting roller ramp for increasing a contact force working between the counter roller body and the at least one carrying roller ensures rotatably driving the at least one carrying roller in an especially reliable manner. The roller ramp, preferably, is arranged directly in front of a capturing region of the sensor unit. The roller ramp can be configured as an elevation of the carrying rail projecting upwards in a vertical direction. The roller ramp ensures an increase in the contact force working from the counter roller body onto the at least one carrying roller, in particular directly in front of the capturing region of the sensor unit, which allows for the rotatable driving of the at least one carrying roller to take place especially reliably.

A roller testing device comprising a carrying unit for carrying the roller adapter in a capturing region of the sensor unit such that the at least one carrying roller is freely rotatable can be operated especially flexibly. The free rotatability of the at least one carrying roller is to be understood such that, except for the bearing forces working via the pivot bearing, no further forces are working onto the at least one carrying roller. Preferably, the carrying unit is configured such that the carrying roller whose pivot bearing's state of wear is determined is freely rotatable. Preferably, for this purpose, the drive unit is arranged outside the capturing region of the sensor unit. In the capturing region of the sensor unit, the drive unit is decoupled from the at least one carrying roller. According to one aspect of the invention, for carrying the roller adapter, the carrying unit interacts with a second carrying roller of the roller adapter.

A roller testing device comprising at least one guiding rail for laterally guiding the roller adapter in a capturing region of the sensor unit ensures the determination of the state of wear in an especially reliable manner. The roller testing device can have at least two, in particular at least three, in particular at least four, guiding rails for laterally guiding the roller adapter, in particular in the capturing region. Preferably, at least one guiding rail is arranged below the at least one carrying roller on the carrying unit. The at least one guiding rail arranged below the at least one carrying roller preferably interacts with the base body of the roller adapter for lateral guiding. The roller testing device can also have two guiding rails arranged below the at least one carrying roller for two-sided guiding of the roller adapter. The roller testing device can also have one or two guiding rails, configured for one-sided or two-sided lateral guiding of the roller adapter, above the at least one carrying roller. The at least one guiding rail advantageously ensures that a pivot axis of the at least one carrying roller is constantly oriented perpendicularly to a conveying direction of the roller adapter and/or parallel to a capturing direction of the sensor unit. Additionally, the roller adapter can be guided and mounted especially safely on the carrying unit, in particular on the carrying rail, by means of the at least one guiding rail.

Another object of the invention is to improve an overhead conveyor system.

This object is achieved by an overhead conveyor system for the transport of goods, comprising a roller testing device according to the invention and a conveyor rail device for transporting the roller adapter. The advantages of the overhead conveyor system according to the invention correspond to the advantages of the roller testing device described above. According to one aspect of the invention, the overhead conveyor system comprises a transport unit with a supply section for displacing the roller adapter out of the conveyor rail device towards the roller testing device and/or a discharge section for displacing the roller adapter out of the roller testing device into the conveyor rail device. The overhead conveyor system preferably has at least two roller testing devices. In particular, the overhead conveyor system has one roller testing device per carrying roller of the roller adapter. Advantageously, however, it is achieved that the state of wear of the pivot bearings of each of the carrying rollers can be determined independently from each other. The plurality of roller testing devices can be arranged parallel to one another, wherein the roller adapter can run through the roller testing device in random order. Alternatively, the roller testing devices can be placed in series, wherein the roller adapter runs through all of the roller testing devices in a determined order.

An overhead conveyor system wherein the roller testing device is integrated in a conveying line of the conveyor rail device for the decoupling-free testing of the roller adapter can be operated especially economically. Preferably, the carrying unit of the roller testing device is configured by a rail profile of the conveyor rail device. Preferably, the drive unit of the roller testing device is configured by a rail drive of the conveyor rail device.

An overhead conveyor system comprising a sorting switch having a signal connection with the evaluation unit, for sorting the roller adapter out of the conveyor rail device in an automated manner, depending on its state of wear can be operated especially economically. Preferably, a roller adapter whose state of wear is beyond an admissible state of wear is automatically sorted out of the conveyor rail device by means of the sorting switch.

Yet another object of the invention is to improve a roller adapter for an overhead conveyor system.

This object is achieved by a roller adapter for an overhead conveyor system with a base body and at least one carrying roller pivotably arranged on the base body by means of a pivot bearing, wherein the carrying roller has a mark for capturing a rotary movement in relation to the base body. Due to the configuration of the roller adapter with the base body and the at least one carrying roller, pivotable by means of the pivot bearing and arranged in the base body, which has the mark for capturing the rotary movement in relation to the base body, the measured value correlating with the state of wear of the pivot bearing can be determined especially easily and reliably. The mark can be configured as an optical mark, in particular as a perforated disc and/or as a color mark and/or as a reflecting mark and/or as a surface structure, in particular varying around the pivot axis of the at least one carrying roller, in particular as an embossing. The mark can also be configured in the form of a body inserted in the carrying roller and made of a metallic and/or magnetic material. The rotary movement of the at least one carrying roller in relation to the base body, thus, can be captured especially easily and reliably by a sensor unit of a roller testing device. Preferably, the mark is arranged on the face side of the at least one carrying roller. Alternatively, the mark can also be arranged circumferentially on the at least one carrying roller.

According to one aspect of the invention, the roller adapter has an identification means, in particular an RFID transponder and/or a matrix code and/or a bar code. Preferably, the identification means is configured for the clear identification of each single one of a plurality of roller adapters.

Another object of the invention is to improve a method for the operation of a roller testing device.

This object is achieved by a method for operating a roller testing device, comprising the steps providing a roller adapter with a base body and at least one carrying roller pivotably arranged on the base body by means of a pivot bearing, rotatably driving the at least one carrying roller, capturing a measured value correlating with a state of wear of the at least one carrying roller and determining the state of wear on the basis of the measured value.

The advantages of the method according to the invention correspond to the advantages already described with regard to the roller testing device, the overhead conveyor system and the roller adapter according to the invention. The method, in particular, can be extended by the features mentioned in the context of the roller testing device, the overhead conveyor system and the roller adapter.

According to one aspect of the invention, an identification code clearly marking the roller adapter is captured. For capturing the identification code, an identification means connected with the respective roller adapter can be read out. In particular, the identification means can be read out in the form of an RFID transponder and/or a matrix code and/or a bar code. Preferably, the measured value and/or the state of wear is stored together with the identification code of the corresponding roller adapter, in particular in a database system. The state of wear of the respective roller adapter can be monitored continuously.

For capturing the measured value, an acceleration, in particular a vibration, in particular of the roller adapter and/or a carrying unit for carrying the roller adapter, can be determined. For capturing the measured value, also an acoustic signal, in particular an ultrasonic signal, in particular in the direct surroundings of the roller adapter and/or on the carrying unit, can be determined. Alternatively or additionally, for capturing the measured value, a temperature, in particular of the roller adapter, in particular of the pivot bearing, can be determined. For capturing the measured value, also a capacity and/or an impedance and/or an electric current and/or an electric voltage can be determined. In particular, for capturing the measured value, a magnetic field change can be determined.

A method wherein for capturing the measured value, a rotary movement of the at least one carrying roller is captured ensures the determination of the state of wear in an especially reliable and robust manner. For capturing the rotary movement, a sensor unit, in particular reversibly couplable, can be brought into a torque transmitting connection with the at least one carrying roller. Alternatively, the capturing of the rotary movement can take place without any contact. For capturing the rotary movement, a number of revolutions and/or a rotational speed and/or a change in the rotational speed and/or a coasting down duration can be determined.

A method wherein for capturing the measured value, the at least one carrying roller is optically captured can be applied especially flexibly and is robust during operation. Preferably, a rotary movement of the at least one carrying roller is captured optically. According to one aspect of the invention, the roller adapter, in particular the at least one carrying roller, is displaced linearly upon capturing the measured value, in particular in relation to the sensor unit for capturing the measured value. In particular, the capturing of the measured value can take place during the continuous displacement of the roller adapter along a conveying line of a conveyor rail device. The capturing of the measured value preferably takes place without decoupling the roller adapter from the conveying line of the conveyor rail device. The method thus can be applied especially easily to an existing overhead conveyor system and can be carried out efficiently.

For optically capturing the measured value, an optical mark, in particular a reflection difference and/or a color difference and/or a transmission difference and/or a structural difference, in particular a surface roughness and/or a surface embossing, of the roller adapter, in particular of the at least one carrying roller and/or the pivot bearing, can be determined.

According to one aspect of the invention, rotatably driving the at least one carrying roller takes place by the at least one carrying roller rolling off on a linear and/or rotatably driven counter roller body. Alternatively, the rotatable driving of the at least one carrying roller can take place by a transmission of a rotary movement to the carrying roller on the face side.

A method wherein the roller adapter is laterally guided upon the capturing of the measured value ensures the determination of the state of wear in an especially reliable manner Preferably, the roller adapter is guided on two sides upon the capturing of the measured value. The roller adapter preferably is guided on the base body. According to one aspect of the invention, the roller adapter, in particular on two sides, is guided laterally above and below the at least one carrying roller. An orientation of the roller adapter in relation to the sensor unit for capturing the measured value thus can be determined reliably, wherein the capturing of the measured value takes place especially robustly.

A method wherein upon the capturing the measured value, the roller adapter is carried such that the at least one carrying roller is freely rotatable can be realized especially economically and is robust during operation. Preferably, upon capturing the measured value, the roller adapter is carried via a second carrying roller, in particular by means of a carrying rail of the carrying unit, interacting with the carrying roller.

A method wherein the capturing of the measured value takes place during a continuous transport of the roller adapter along a conveying line can be applied especially economically.

A method comprising comparing the state of wear with an admissible state of wear and sorting the roller adapter out of a conveyor rail device, provided that the state of wear is beyond the admissible state of wear provides for an especially efficient operation of an overhead conveyor system. Preferably, sorting the roller adapter out of the conveyor rail device takes place in an entirely automated manner Sorting out the roller adapter can take place directly following the capturing of the state of wear. Alternatively, the state of wear can be stored together with the identification code of the respective roller adapter and the roller adapter can be sorted out at a later point of time. For sorting the roller adapter out of the conveyor rail device, it can be decoupled from the conveyor rail device and displaced along a sorting line.

The conveyor rail device can also be supplied with a roller adapter. Preferably, each roller adapter that has been sorted out is replaced by supplying a functional roller adapter. According to one aspect of the invention, a number of roller adapters is maintained essentially constant in the conveyor rail device. The overhead conveyor system, for this purpose, can have a supply device for supplying roller adapters into the conveyor rail device. The supply device can have a signal connection with a control device for controlling the number of roller adapters in the conveyor rail device.

Further features, advantages and details of the invention arise from the following description of two embodiments with reference to the figures.

DESCRIPTION OF THE PREFERRED EMBODIMENTS

In the following, an embodiment of an overhead conveyor system 1 for the transport of goods is described with reference to FIG. 1 to FIG. 4. The overhead conveyor system 1 comprises a conveyor rail device 2 and a plurality of roller adapters 3 displaceably mounted to the conveyor rail device 2. The conveyor rail device 2 has a rail profile 4 and a rail drive 5. The roller adapter 3 is mounted in the rail profile 4 by positive locking, wherein the roller adapter 3 is displaceable along a conveying line 6, linearly along the rail profile 4.

For the displacement of the roller adapter 3 along the conveying line 6, the rail drive 5 comprises a conveyor chain 7 interacting with the roller adapter 3. The conveyor chain 7 is guided in the rail profile 4. By means of a drive motor, which is not depicted, of the rail drive 5, the conveyor chain 7 is displaceable in relation to the rail profile 4.

The conveyor chain 7 is configured as a roller chain. The conveyor chain 7 comprises a plurality of driving pins 8 for the linearly driving the roller adapter 3.

The roller adapter 3 comprises a base body 9, two pivot bearings 10 arranged thereon and one carrying roller 11 each, pivotably mounted to the base body by means of the pivot bearing. For the linear displacement of the roller adapter 3 in the rail profile 4, the two carrying rollers 11 roll off on a carrying rail 12 of the rail profile 4.

The roller adapter 3 has a lifting lug 13 arranged on the base body 9 for mounting transport goods and a drive extension 14 arranged on the base body 9 for the displacement of the roller adapter 3 along the conveying line 6. The drive extension 14 is configured to interact with the driving pins 8. The drive extension 14 is configured as a bar orienting parallel to a pivot axis 15 of the carrying rollers 11.

The roller adapter 3 has a matrix code 16. The matrix code 16 is embossed into the base body 9. The matrix code 16 corresponds to an identification code which is individual for each roller adapter.

The overhead conveyor system 1 has a roller testing device 17 for the roller adapter 3. The roller testing device 17 comprises a drive unit 18 for rotatably driving at least one of the carrying rollers 11 of the roller adapter 3, a sensor unit 19 for capturing a measured value correlating with a state of wear of the pivot bearing 10 and an evaluation unit 20 for the determination of the state of wear on the basis of the measured value. The drive unit 18 comprises a counter roller body 21 and a drive means 22 for the linear displacement of the roller adapter 3 in relation to the counter roller body 21. The drive means 22 is configured in the form of the rail drive 5. The counter roller body 21 is configured in the form of the carrying rail 12. The counter roller body 21 comprises a roller ramp 23 projecting from the carrying rail 12 to increase a contact pressure working onto the at least one carrying roller.

The roller testing device 17 has a measuring field 24. The measuring field 24 extends along the conveying line 6 across a measuring field length $L_M$. In the region of the measuring field 24, the roller adapter 3, in particular the carrying roller 11, can be captured by the sensor unit 19.

In the region of the measuring field 24, only one of the carrying rollers 11 is in contact with the carrying rail 12. The other carrying roller 11 is arranged freely rotatably on the roller adapter 3 in the region of the measuring field 24. For this purpose, the corresponding carrying rail 12 is recessed in the region of the measuring field 24. The roller ramp 23 is arranged directly in front of the measuring field 24 on the side of the carrying roller 11, which is freely rotatable in the measuring field 24.

In the region of the measuring field 24, the rail profile 4 has a measuring window 25. The measuring window 25 is configured as a rectangular recess in the rail profile 4. The measuring window 25 is covered by a translucent pane 26, in particular a plexiglass pane.

The sensor unit 19 is configured in the form of a camera. The sensor unit 19 is configured for the optical capturing of the carrying roller 11 in the region of the measuring field 24. In particular, the sensor unit 19 is configured for the optical capturing of a rotary movement of the carrying roller 11. The carrying roller 11 allocated to the sensor unit 19 will also be named as testing roller 27 in the following.

The respective carrying roller 11 has a mark 28 for the optical capturing of the rotary movement by means of the sensor unit 19. The carrying rollers 11 are manufactured in an injection molding process. The mark 28 is configured in the form of injection points resulting from the injection molding process.

A capturing direction 29 of the sensor unit 19 is oriented parallel to the pivot axis 15. A measuring distance $x_M$ between the sensor unit 19 and the testing roller 27 is 200 mm. The sensor unit 19 has a signal connection with the evaluation unit 20 via a central signal line 30.

The roller testing device 17 has a sorting switch 31. The sorting switch 31 is configured to sort the roller adapter 3 automatically out of conveyor rail device 2. The sorting switch 31 has a signal connection with the evaluation unit 20 via a points signal line 32.

The roller testing device 17 comprises an identification means reader 33 for capturing an identification means connected with the roller adapter 3, in particular the matrix code 16. The identification means reader 33 is arranged directly in front of the sorting switch 31. The sensor unit 19 is configured as a further identification means reader 33.

The operating principle of the overhead conveyor system 1, the roller testing device 17 and the roller adapter 3 is as follows:

Due to the guided displacement of the roller adapter 3 along a conveying direction 34, the roller testing device has two guiding rails 35. The guiding rails 35 are configured for the lateral guiding of the roller adapter 3 in the region of the measuring field 24. The guiding rails 35 are arranged along the conveying line 6 on both sides of the roller adapter 3, below the carrying rails 12, respectively. The guiding rails 35 are configured to interact laterally with the base body 9. The guiding rails 35 are configured in one piece with the rail profile 4.

In the region of the drive extension 14, the roller adapter 3 is laterally guided by drive guiding rails 36. The drive guiding rails 36 are arranged along the conveying line 6 on both sides of the roller adapter 3. The drive guiding rails 36 interact with the drive extension 14 in the region of the measuring field 24.

The roller adapter 3 is arranged in the rail profile 4 and displaceably mounted along the conveying line 6. For this purpose, the carrying rollers 11 roll off on the carrying rails 12. By means of the rail drive 5, the roller adapter 3 is displaced via the drive extension 14 by one of the driving pins 8 of the conveyor chain 7 along a conveying direction 34 in relation to the rail profile 4.

Preferably, both carrying rollers 11 are constantly in contact with the respective carrying rail 12 along the conveying line 6. Due to a mounting with play of the roller adapter 3 in the rail profile 4, it cannot be excluded that at least one of the carrying rollers 11, at least temporarily, loses the contact with the corresponding carrying rail 12. In order to ensure the contact of the testing roller 27 with the carrying rail 12 configured as a counter roller body 21 directly in front of the measuring field 24 in a reliable manner, the roller ramp 23 is arranged directly in front of the measuring field 24 on the carrying rail 12. The roller adapter 3 is displaced along the conveying line 6 via the roller ramp 23. The contact force working from the counter roller body 21 onto the testing roller 27 is increased and the testing roller 27 is rotatably driven in a reliable manner.

The roller adapter 3 is displaced into the measuring field 24. In the region of the measuring field 24, the roller adapter 3 is carried exclusively by the carrying roller 11 turned away from the sensor unit 19. The carrying rail 12 corresponding to the testing roller 27 is recessed in the region of the measuring field 24. In the region of the measuring field 24, the testing roller 27 is out of contact with the carrying rail 12 and thus is rotatably arranged on the base body 9. In the region of the measuring field 24, the roller adapter 3 is laterally guided on the head side due to an interaction of the drive guiding rails 36 with the drive extension 14, and on the foot side due to an interaction of the guiding rails 35 with the base body 9. The pivot axis 15 is reliably aligned parallel to the capturing direction 29 due to the lateral guiding. The carrying roller 11 turned away from the sensor unit 19 is reliably held on the corresponding carrying rail 12.

By means of the sensor unit 19, the matrix code 16 is captured for identifying the roller adapter 3. For capturing the measured value correlating with the state of wear of the pivot bearing 10 of the testing roller 27, the testing roller 27, in particular the marks 28, is continuously captured optically. The measured value corresponds to an image sequence captured by the sensor unit 19. By means of the evaluation unit 20, on the basis of the measured value, in particular on the basis of the image sequence, the state of wear of the pivot bearing 10 of the testing roller 27 is determined. For this purpose, first of all, a change in the position of the marks 28 over time is determined. Out of the change in the position of the marks 28, an initial rotational speed of the testing roller 27 upon the entry into the measuring field 24 is determined. On the basis of the change in the position of the marks 28 along the conveying line 6, a change in the rotational speed of the testing roller 27 is determined. In particular, a coasting down duration T of the testing roller 27 is determined. The coasting down duration T corresponds to a time period which passes between the entry of the roller adapter 3 into the measuring field 24 and the termination of the rotary movements of the testing rollers 27 in relation to the base body 9. The coasting down duration T correlates with a rotational resistance of the testing roller 27 in relation to the base body 9. The rotational resistance rises along with an increasing wearing of the pivot bearing 10. Via the coasting down duration T, thus, the state of wear of the pivot bearing 10 is determined. The state of wear of the testing roller 27 is stored in conjunction with the identification code corresponding to the matrix code 16.

By means of the evaluation unit 20, the state of wear is compared with an admissible state of wear. Provided that the state of wear surpasses a wear limit, the roller adapter 3 is marked as worn. By means of the sorting switch 31, the roller adapter 3 is removed from the conveyor rail device 2 via a reject conveying line 37. For this purpose, the identification code of the roller adapter 3, corresponding to the matrix code 16, is captured directly in front of the sorting switch 31. Provided that the roller adapter 3 is marked as worn, the sorting switch 31 is switched to convey the roller adapter 3 along the reject conveying line 37. If the roller adapter 3 is marked as functional, the sorting switch 31 is switched by means of the evaluation unit 20 to convey the roller adapter 3 along the conveying line 6.

In order to check the state of wear of the pivot bearing 10 of the second carrying roller 11, the overhead conveyor system 1 has a second roller testing device 17, which is not depicted. The setup of the second roller testing device 17 corresponds to the setup of the roller testing device 17 described above, wherein the setup of the roller testing device 17 is configured mirrored to a symmetry plane 38 of the roller adapter 3. The state of wear of the two pivot bearings 10 of the roller adapter 3 is determined consecutively along the conveying line 6. Provided that the state of wear of one of the two pivot bearings 10 surpasses the wear limit, the roller adapter 3 is removed via the sorting switch 31 from the conveyor rail device 2.

Figure 1:
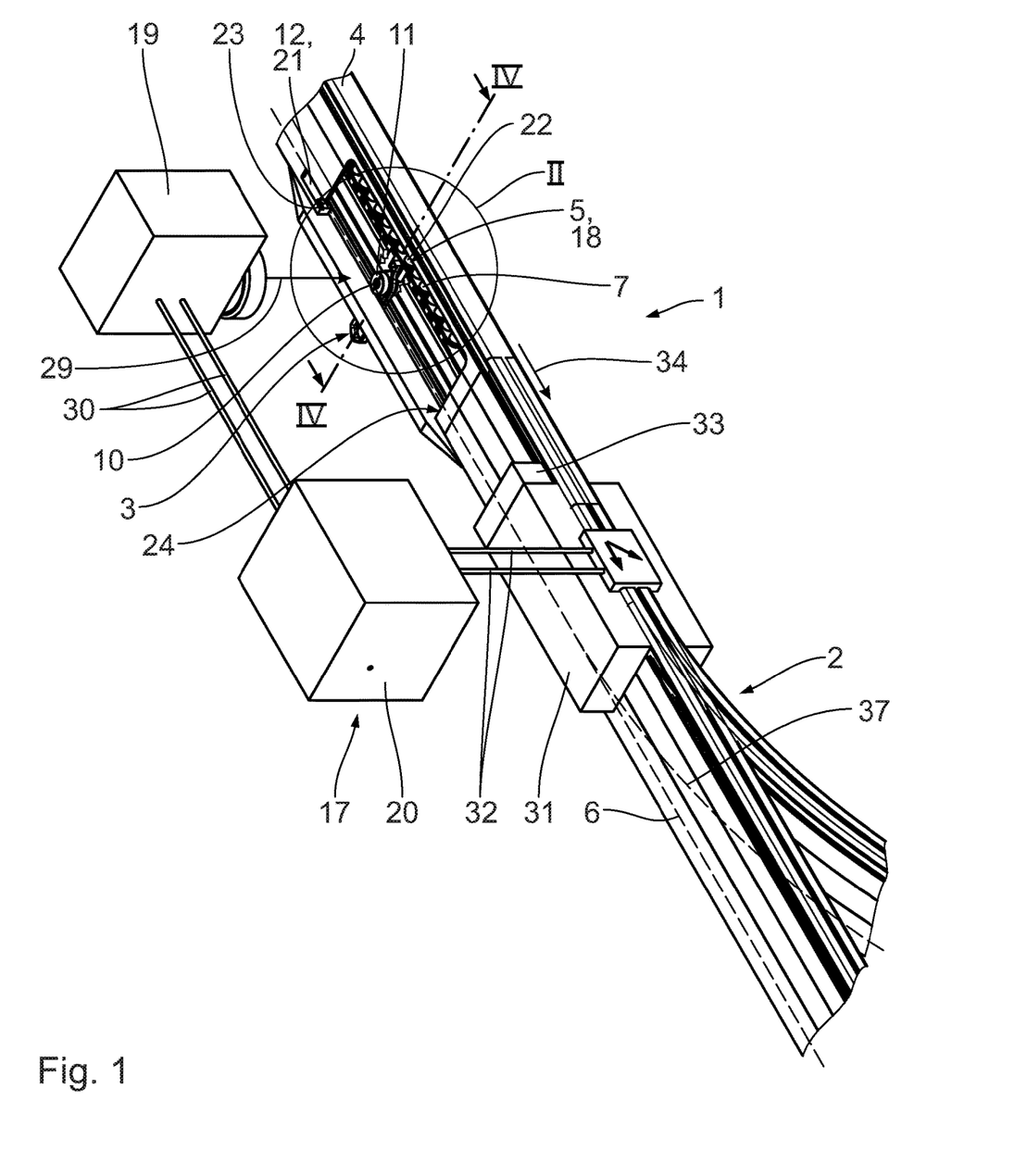
FIG. 1 shows a perspective view of a section of an overhead conveyor system with a conveyor rail device for transporting a roller adapter and a roller testing device for the roller adapter.
Figure 2:
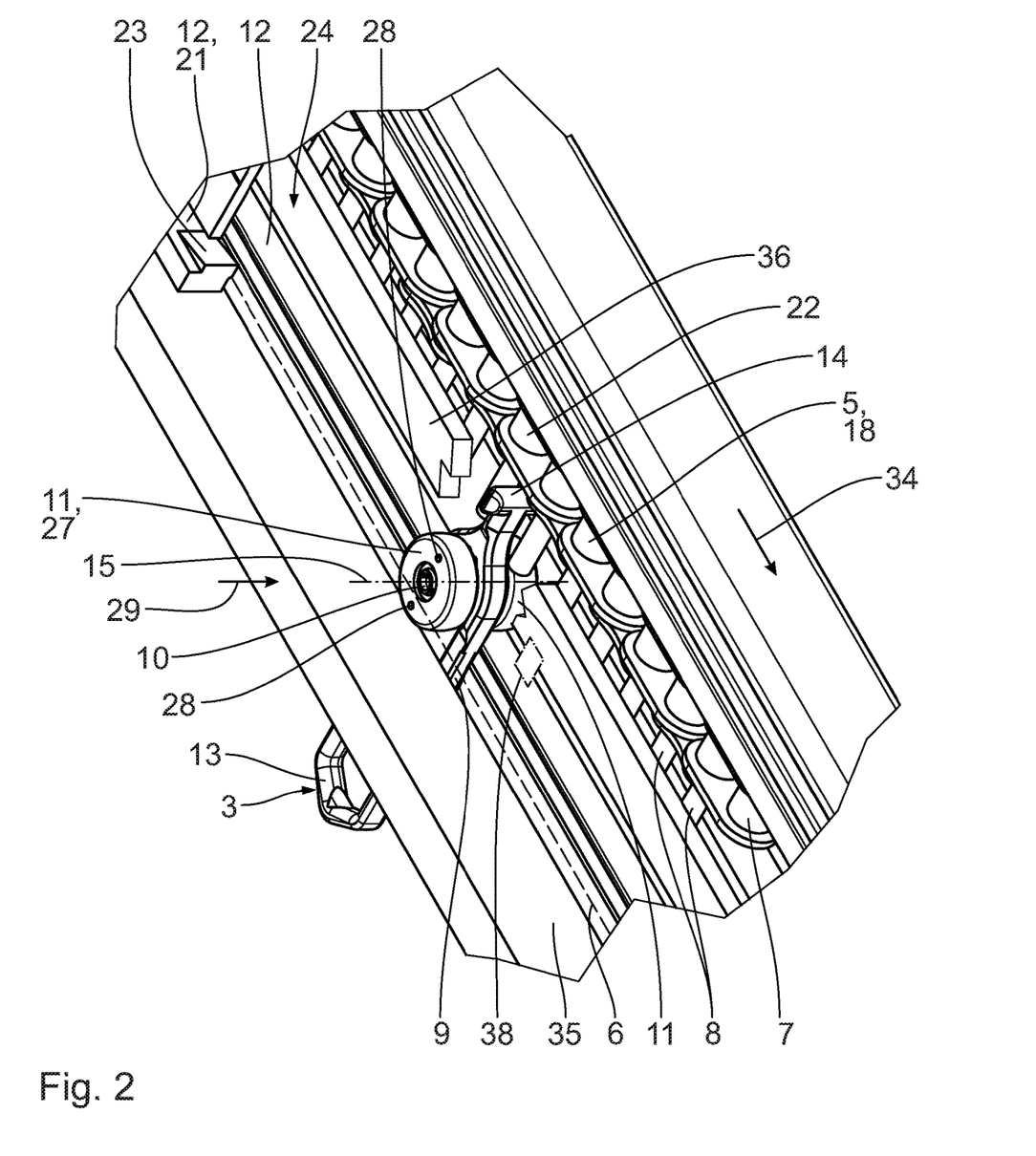
FIG. 2 shows a perspective detailed view of the roller testing device according to section II in FIG. 1, wherein a conveyor rail of the roller testing device is depicted partially discontinuous in the region of the roller adapter.
Figure 3:
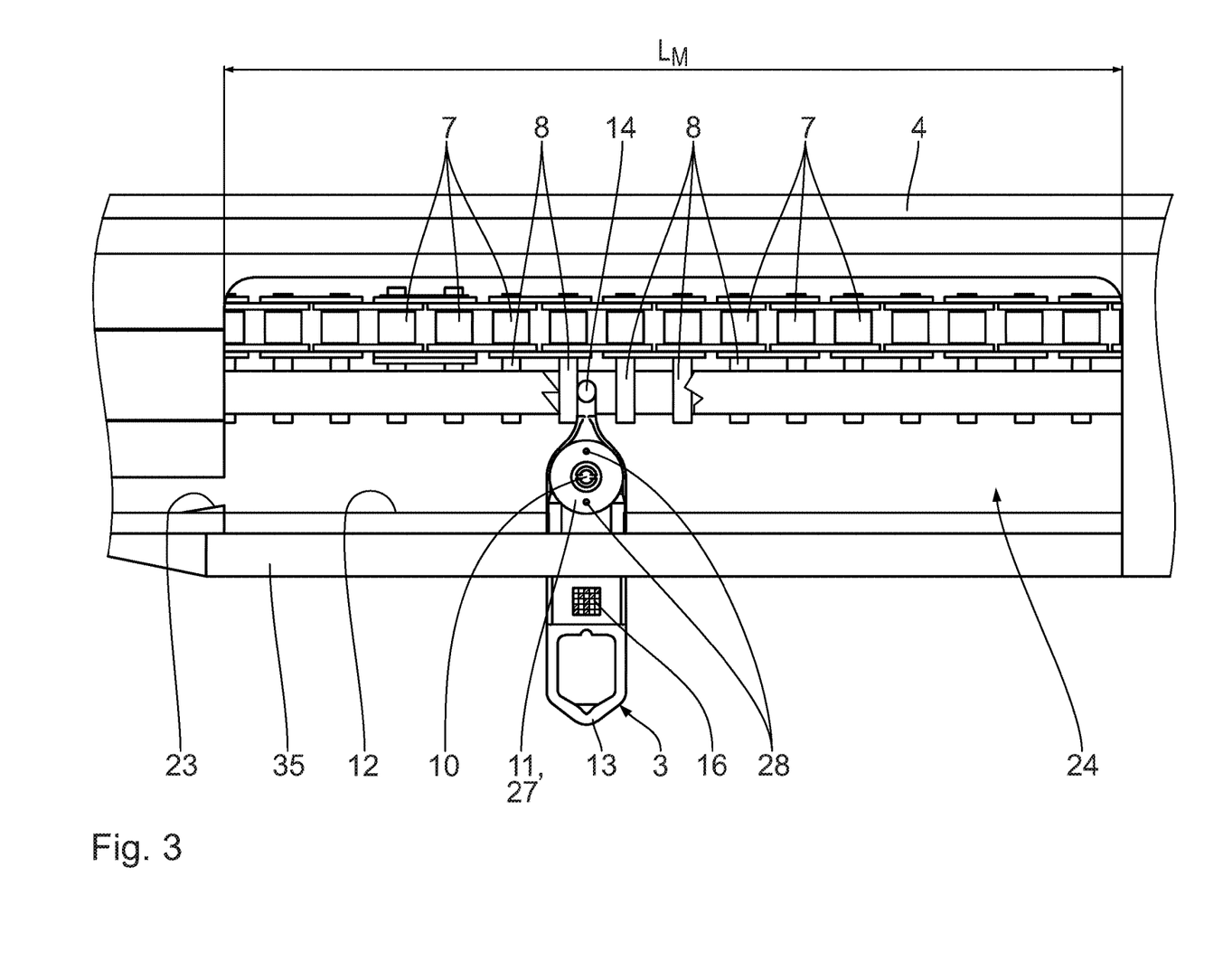
FIG. 3 shows a side view of the roller testing device in FIG. 2.
Figure 4:
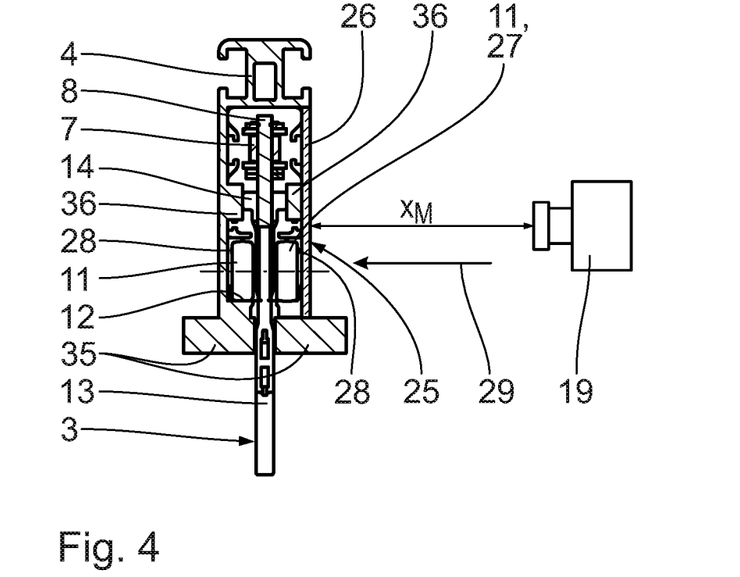
FIG. 4 shows a sectional view of the roller testing device along the intersection line IV-IV in FIG. 1
Figure 5:
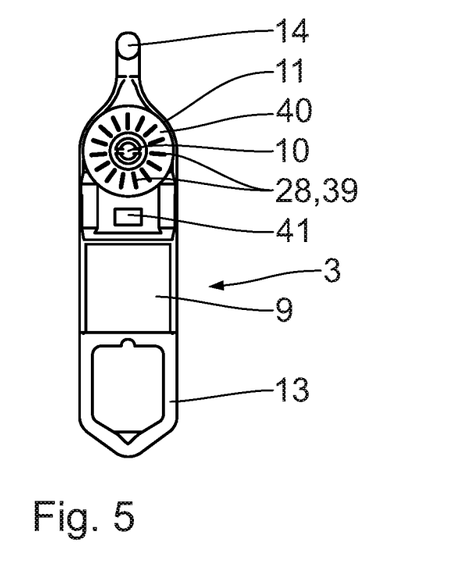
FIG. 5 shows a side view onto a roller adapter according to a further embodiment, wherein a carrying roller of the roller adapter has a mark for capturing a rotary movement.

With reference to FIG. 5, another embodiment of a roller adapter 3 is described. In contrast to the embodiment described above, the mark 28 of the carrying rollers 11 is configured in the form of a plurality of recesses 39 radially extending towards the pivot axis 15 in the region of a lateral surface 40 of the respective carrying roller 11. In total, fifteen recesses 39 are arranged on each carrying roller 11. The rotational speed of the respective carrying roller 11, the coasting down duration T and thus the state of wear of the respective carrying roller 11 thus can be determined especially exactly.

For the capturing of the identification code of the roller adapter 3 without physical or visual contact, the latter has an RFID transponder 41. The identification means reader 33 accordingly has an RFID reader.

The operating principle of the roller adapter 3 depicted in FIG. 5 corresponds to the operating principle of the roller adapter 3 according to the embodiment described above. For capturing the rotary movement of the testing roller 27 in relation to the base body 9, the mark 28 configured in the form of the recesses 39 is captured. The identification code of the roller adapter 3 is captured by reading out the RFID transponder 41.

By means of the roller testing device 17, the state of wear of the roller adapters 3, in particular of the pivot bearings 10 of the respective carrying roller 11, can be determined in an automated manner. Worn roller adapters 3 can be removed in an automated manner from the conveyor rail device 2 via the sorting switch 31. A downtime of the overhead conveyor system 1 caused by worn roller adapters 3 can be reliably avoided by detecting and sorting out of the worn roller adapters 3 at an early stage. The overhead conveyor system 1 with the roller testing device 17 thus can be operated especially reliably and efficiently. The automated detection and sorting out of the worn roller adapters 3 provides for an especially economical operation of the overhead conveyor system 1.

What is claimed is:

1. A roller testing device for a roller adapter of an overhead conveyor system, the roller testing device comprising:
 a drive unit for rotatably driving at least one carrying roller of the roller adapter;
 a sensor unit for capturing a measured value correlating with a state of wear of a pivot bearing of the at least one carrying roller; and
 an evaluation unit for the determination of the state of wear on the basis of the measured value, the evaluation unit having a signal connection with the sensor unit via which the evaluation unit receives the measured value, the evaluation unit comprising an electronic component that determines the state of wear based on the measured value.

2. The roller testing device according to claim 1, wherein the sensor unit has a rotary sensor for capturing the measured value in the form of a rotary movement of the at least one carrying roller.

3. The roller testing device according to claim 1, wherein the sensor unit has a camera system for optically capturing the measured value.

4. The roller testing device according to claim 1, wherein the drive unit has a counter roller body and a drive means for the linear displacement of the roller adapter in relation to the counter roller body, wherein the counter roller body is arranged on the at least one carrying roller such that the at least one carrying roller can be rotatably driven by the displacement in relation to the counter roller body.

5. The roller testing device according to claim 4, wherein the counter roller body has a projecting roller ramp for increasing a contact force working between the counter roller body and the at least one carrying roller.

6. The roller testing device according to claim 1, further comprising a carrying unit for carrying the roller adapter in a capturing region of the sensor unit such that the at least one carrying roller is freely rotatable.

7. The roller testing device according to claim 1, comprising at least one guiding rail for laterally guiding the roller adapter in a capturing region of the sensor unit.

8. An overhead conveyor system for the transport of goods, the overhead conveyor system comprising:
 a roller testing device according to claim 1; and
 a conveyor rail device for transporting the roller adapter.

9. The overhead conveyor system according to claim 8, wherein the roller testing device is integrated in a conveying line of the conveyor rail device for the decoupling-free testing of the roller adapter.

10. The overhead conveyor system according to claim 8, further comprising a sorting switch having a signal connection with the evaluation unit, for sorting the roller adapter out of the conveyor rail device in an automated manner, depending on the state of wear of the roller adapter.

11. A method for operating a roller testing device, the method comprising the steps:
 providing the roller testing device with a drive unit and a sensor unit;
 providing a roller adapter comprising a base body and at least one carrying roller pivotably arranged on the base body by a pivot bearing;
 rotatably driving the at least one carrying roller via the drive unit;
 capturing a measured value correlating with a state of wear of the at least one carrying roller via the sensor unit; and
 determining the state of wear based on the measured value.

12. The method according to claim 11, wherein for capturing the measured value, a rotary movement of the at least one carrying roller is captured.

13. The method according to claim 11, wherein for capturing the measured value, the at least one carrying roller is optically captured.

14. The method according to claim 11, wherein the roller adapter is laterally guided upon the capturing of the measured value.

15. The method according to claim 11, wherein upon the capturing the measured value, the roller adapter is carried such that the at least one carrying roller is freely rotatable.

16. The method according to claim 11, wherein the capturing of the measured value takes place during a continuous transport of the roller adapter along a conveying line.

17. The method according to claim 11, further comprising comparing the state of wear with an admissible state of wear and sorting the roller adapter out of a conveyor rail device, provided that the state of wear is beyond the admissible state of wear.

18. The method according to claim 11, wherein the at least one carrying roller comprises a mark for capturing a rotary movement relative to the base body, wherein the mark comprises a body of metallic or magnetic material inserted in the at least one carrying roller.

19. The method according to claim 18, wherein the roller testing device comprises an evaluation unit, the evaluation unit comprising an electronic component configured to determine the state of wear based on the measured value.

* * * * *